Jan. 27, 1970 — K. V. SKIPP — 3,492,034
COUPLING PIECES
Filed Jan. 31, 1969
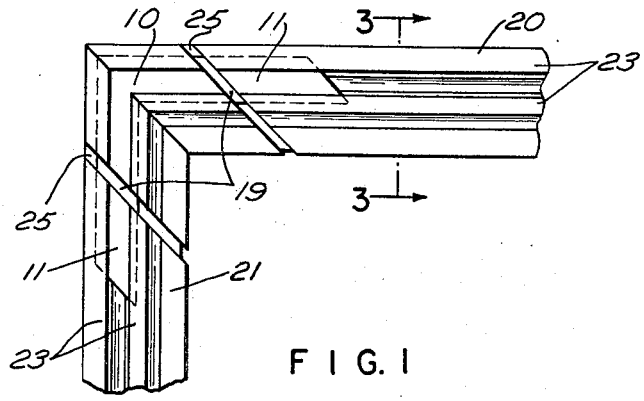
FIG. 1
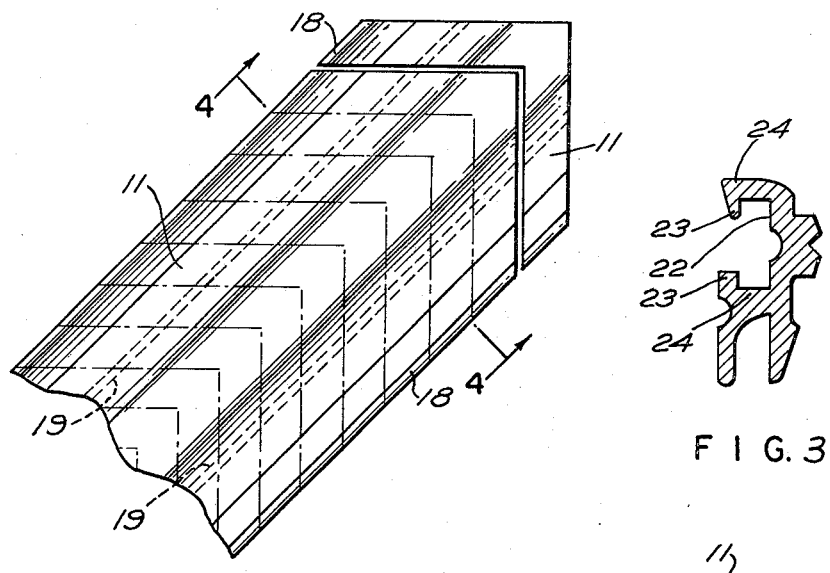
FIG. 2
FIG. 3
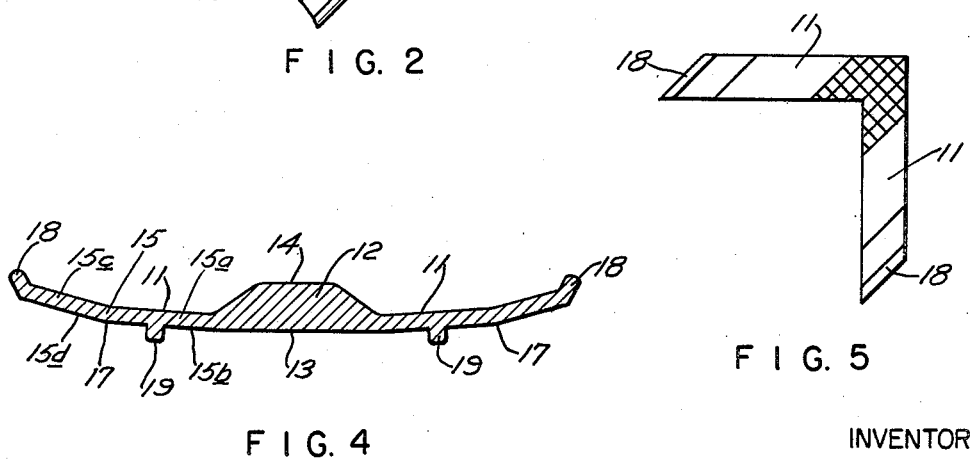
FIG. 4
FIG. 5
INVENTOR
KENNETH V. SKIPP
BY
Barlow & Barlow
ATTORNEYS

United States Patent Office 3,492,034
Patented Jan. 27, 1970

3,492,034
COUPLING PIECES
Kenneth Valentine Skipp, 16 Rushbrook Road,
Stratford-upon-Avon, Warwick, England
Filed Jan. 31, 1969, Ser. No. 795,518
Claims priority, application Great Britain, Jan. 31, 1968,
4,916/68
Int. Cl. F16b 1/00
U.S. Cl. 287—189.36          4 Claims

ABSTRACT OF THE DISCLOSURE

A coupling piece for connecting together a pair of channel-sections or box-section members is formed from an extrusion which includes a thickened centre portion and bowed side portions by making V-shaped cuts in the extrusion.

BACKGROUND OF THE INVENTION

Field of the invention

This invention relates to coupling pieces for securing together in co-planar relationship a pair of members each having a sectional shape such that they define first and second spaced apart parallel abutment surfaces, for example, members of box-section or of channel-section.

Description of the prior art

Coupling pieces have previously been provided which have been of L-form in plan providing a pair of limbs for passage between the two abutment surfaces of the members to be coupled. The limbs have had a cross-sectional configuration corresponding to the configuration of the space between the abutment surfaces and they have been held in position by screws or like fasteners or they have been force-fits between the abutment surfaces.

If fasteners are used to hold the limbs of the coupling pieces in position this involves additional steps in the assembly of the members to be coupled and there is the danger of the fasteners becoming loose and thus of the limbs of the coupling piece becoming disengaged from between the abutment surfaces.

If the limbs of the coupling pieces have force-fit engagement between the abutment surfaces of the members being coupled it is necessary that the coupling pieces and the members to be coupled should be produced of sizes within a very close range of tolerances since, if the coupling pieces are under size or the members to be coupled are over size, the limbs will easily be removed from between the abutment surfaces of the members being coupled.

It is accordingly an object of the present invention to provide an improved construction of coupling piece capable of allowing for variations in the sizes of the members being coupled and which is easily engaged with the members to be coupled.

SUMMARY OF THE INVENTION

A coupling piece for the purpose described above including a body portion and a pair of leg elements extending from said body portion, each of said leg elements being adapted to engage between the abutment surfaces of a member to be coupled and having the free end thereof displaced so as to provide frictional locating engagement between the coupling piece and the abutment surfaces of said members.

BRIEF DESCRIPTION OF THE DRAWINGS

FIGURE 1 is a plan view showing a pair of channel-section members joined together by means of a coupling piece, FIGURE 2 is a plan view of a coupling piece,
FIGURE 3 is a sectional view of one of the members being coupled,
FIGURE 4 is a sectional view of an extrusion from which the coupling piece is formed, and
FIGURE 5 is a plan view of an alternative form of coupling piece.

DESCRIPTION OF THE PREFERRED EMBODIMENT

A coupling piece in accordance with the present invention is of angle shape in plan including a central body portion 10 and a pair of leg elements 11, the leg elements defining therebetween an angle of 90°, the leg elements being of rectangular form in section but being bowed in side elevation as is hereinafter explained.

The coupling pieces are formed from an extrusion of, for example an aluminium alloy by forming a pair of V-shaped cuts in the extrusion, one V-shaped cut defining the front edge of a coupling piece and the rear edge of another coupling piece and the second V-shaped cut defining the rear edge of said one coupling piece and the front edge of a further coupling piece.

The extrusion from which the coupling piece shown in FIGURE 2 is formed includes a central portion 12 corresponding to the body portion 10 of a coupling piece, the central portion 12 having a generally flat lower surface 13 and a curved upper surface 14 so that said central portion 12 is of substantially dome shape and may be of some 0.145 inch thick at its deepest point. The side portions 15 and 16 of the extrusion which correspond to the legs 11 are of some 0.05 inch in thickness and from the junction with the central portion 12 each of said side portions 15 and 16 is inclined slightly upwardly away from the lower surface of said central portion 12, and, from a point 17 intermediate the edge of each side portion 15, 16 and the central portion 12, each side portion 15, 16 is further cranked upwardly at a somewhat steeper angle. Each side portion of the extrusion thus includes the first part such as 15a having a lower surface 15b inclined at a first acute angle to the lower surface 13 and a second part such as 15c having a lower surface 15d inclined at a larger angle to said surface 13. For example, the upward inclination of the part 15a may be some 3° whilst the upward inclination of the outer part 15c may be about 15°. The free end of each side portion 15, 16 is turned upwardly so as to provide a bearing portion 18.

The extrusion is formed with a pair of square cross-section ribs 19 which are located on the lower surface of each side portion 15, 16 intermediate the central portion 14 and the point 17.

The coupling piece is cut in "fishbone pattern" from the extrusion and has the configuration indicated in FIGURE 2, each coupling piece being defined by a pair of V-shaped cuts and thus the manufacture of the coupling pieces is extremely economical and little if any waste material is created. The extrusion is preferably made from a material having a high proof stress and a low Young's modulus such as a heat-treated aluminum alloy. The coupling piece may measure some 2 inches from one bearing portion 18 to the other with the depth of the coupling piece from the lower surface 13 of the central body portion 10 to the top of the two bearing portions 18 can be 0.158 inch with the width of each leg 11 0.25 inch.

FIGURE 1 shows a coupling piece in use connecting a pair of frame members 20 and 21, each of the grame members 20. 21 having the cross-sectional configuration shown in FIGURE 3, i.e. each frame member 20, 21 is of generally channel-section with the base 22 of the channel affording a first abutment surface which is parallel to and spaced from a second abutment surface afforded by the oppositely facing surfaces of a pair of lips 23 extending inwardly of the side walls 24 of the channel of the frame member.

The depth of the coupling piece is somewhat greater than the spacing between the abutment surfaces of each frame member so that, when the frame members are joined together, the coupling piece is stressed so as to ensure positive frictional location between the coupling piece and each frame member. The lips 23 of each frame member are formed with a slot 25 and the slots 25 are arranged so that, when the legs 11 of the coupling pieces are inserted in the openings of the frame members, the rib formations on the legs afforded by the longitudinal ribs 19 of the extrusion snap into seating engagement in the slot formations provided in the frame members 20 and 21.

Such a coupling piece engaging within the openings of the frame members provides an effective joint between the frame members, the joint being concealed and, by providing a second central body portion 10 not only is the strength of the coupling piece increased but the strength of the joint is increased since the body portion 10 effectively fills the corner where the frame members meet.

In some instances it may not be practical to form slots such as those indicated at 25 in the frame members and, in order to increase the frictional grip obtained between the coupling piece and each of the frame members being joined, the coupling piece may have the configuration shown in FIGURE 5.

The coupling piece of FIGURE 5 is formed from an extrusion similar to that shown in FIGURE 4 except that the ribs 19 are omitted and, instead, a number of smaller longitudinal ribs are provided on the upper surfaces 14 of the central body portion 12 and also on the lower surface thereof. The cutting tools used to cut the extrusion in "fishbone pattern" are provided with tooth formations arranged to engage with the central body portion 12 of the extrusion, the teeth of the tools extending transversely of the ribs on the extrusion so that two series of channels intersecting at 90° are provided on the upper surfaces and on the lower surface of the thickened body portion 10 of each coupling piece, the pattern on the upper surface being as shown in FIGURE 5 and a corresponding pattern being provided on the lower surface of the coupling piece.

A coupling piece as described above is particularly applicable for the connection together of frame members of a frame for a vehicle registration plate but it can be used for other purposes, for example, for frames for air grills in ventilating equipment, in window frames or in picture frames.

What is claimed is:

1. A coupling piece for securing together in co-planar relationship a pair of members each having a sectional shape such that they define a pair of spaced apart parallel abutment surfaces, the coupling piece including a body portion and a pair of leg elements extending from said body portion, each of the leg elements being adapted to engage between the abutment surfaces of one of the members to be coupled and each of said leg elements having the free end thereof displaced out of the plane containing the major portion of the leg element whereby, when said leg elements are engaged between the abutment surfaces of said members, there is frictional locating engagement between each leg element and the abutment surfaces of the associated member.

2. A coupling piece according to claim 1 in which the pair of leg elements are arranged to subtend a right-angle therebetween.

3. A coupling piece according to claim 2 in which the body portion is of substantially greater thickness than each of the leg elements, the leg elements being of generally rectangular form in plan view and of a bowed shape in side elevation with the degree of bow increasing towards the free end of each leg element.

4. A coupling piece according to claim 1 wherein one face of each leg element is formed with a transversely extending rib for engagement in a slot or recess in the corresponding abutment surface of the associated member.

References Cited

UNITED STATES PATENTS

| 1,479,999 | 1/1924 | Forsyth | 52—476 X |
| 2,804,952 | 9/1957 | Nothdurft | 52—475 X |
| 3,183,560 | 5/1965 | Brichard | 52—656 X |
| 3,253,847 | 5/1966 | Webster | 287—189.36 |
| 3,434,749 | 3/1969 | Meyer | 287—20.92 |

FOREIGN PATENTS

| 1,394,576 | 2/1965 | France. |

DAVID J. WILLIAMOWSKY, Primary Examiner

WAYNE L. SHEDD, Assistant Examiner

U.S. Cl. X.R.

52—475, 656; 287—20.92